United States Patent
Abbott

[15] 3,687,476
[45] Aug. 29, 1972

[54] REMOVABLE DOLLY WHEEL FOR BOAT

[72] Inventor: Roderic M. Abbott, 920 7 E. Nassau, Denver, Colo. 80237

[22] Filed: Sept. 21, 1970

[21] Appl. No.: 73,867

[52] U.S. Cl. ............................. 280/47.32, 280/414 A
[51] Int. Cl. ................................................. B62b 1/14
[58] Field of Search ........ 280/47.32, 47.13 B, 414 A; 9/1 T

[56] References Cited

UNITED STATES PATENTS

| | | |
|---|---|---|
| 2,978,257 | 4/1961 | Barker .................... 280/47.32 |
| 2,809,469 | 10/1957 | Geil ....................... 280/414 R |
| 3,072,376 | 1/1963 | Bhend ................ 280/414 R X |
| 1,370,592 | 3/1921 | King .............................. 9/1 T |
| 3,313,554 | 4/1967 | Hall ........................... 9/1 T X |

*Primary Examiner*—Benjamin Hersh
*Assistant Examiner*—John A. Pekar
*Attorney*—Richard D. Law

[57] ABSTRACT

A single-wheeled, cushioned dolly mountable under an automobile-top carried boat for conveniently wheeling the boat from the automobile to the water. This readily dismantled device includes an adjustable cross-member which is adaptable to various size boats and spring loaded cables for securing the boat.

6 Claims, 4 Drawing Figures

PATENTED AUG 29 1972   3,687,476

INVENTOR
RODERIC M. ABBOTT
BY
Richard D. Law
ATTORNEY

REMOVABLE DOLLY WHEEL FOR BOAT

Many boats, including kayaks, rowboats, small speedboats, and light sailboats, may be carried upon the roof of an automobile. Trailer expense, such as initial cost, maintenance and license fees are thereby eliminated and the automobile is more easily driven without a trailer. However, the boat, when taken from the automobile top, is not as easily moved about particularly by one person. Typically, two people, both reasonably strong, are required to manually carry the boat about when it is being launched, when maintenance operations are being performed upon it, and other times when it must be moved from one location to another.

An important object of the present invention is to provide a boat-attachable apparatus by means of which one person may easily and conveniently manually move a light boat even up to a considerable distance.

Another object of the invention is to provide such an apparatus which is easily attached to securely hold a boat.

A further object of the invention is to provide such an apparatus which is quickly and conveniently dismantled for storage in restricted areas such as automobile trunks.

Yet another object is to provide such an apparatus which is economically fabricated and essentially maintenance-free and which can be adapted easily to boats of various sizes or configurations.

These and other objects and advantages of the present invention may be readily ascertained by referring to the following description and appended illustrations in which.

Figures 1, 2, 3, 4:
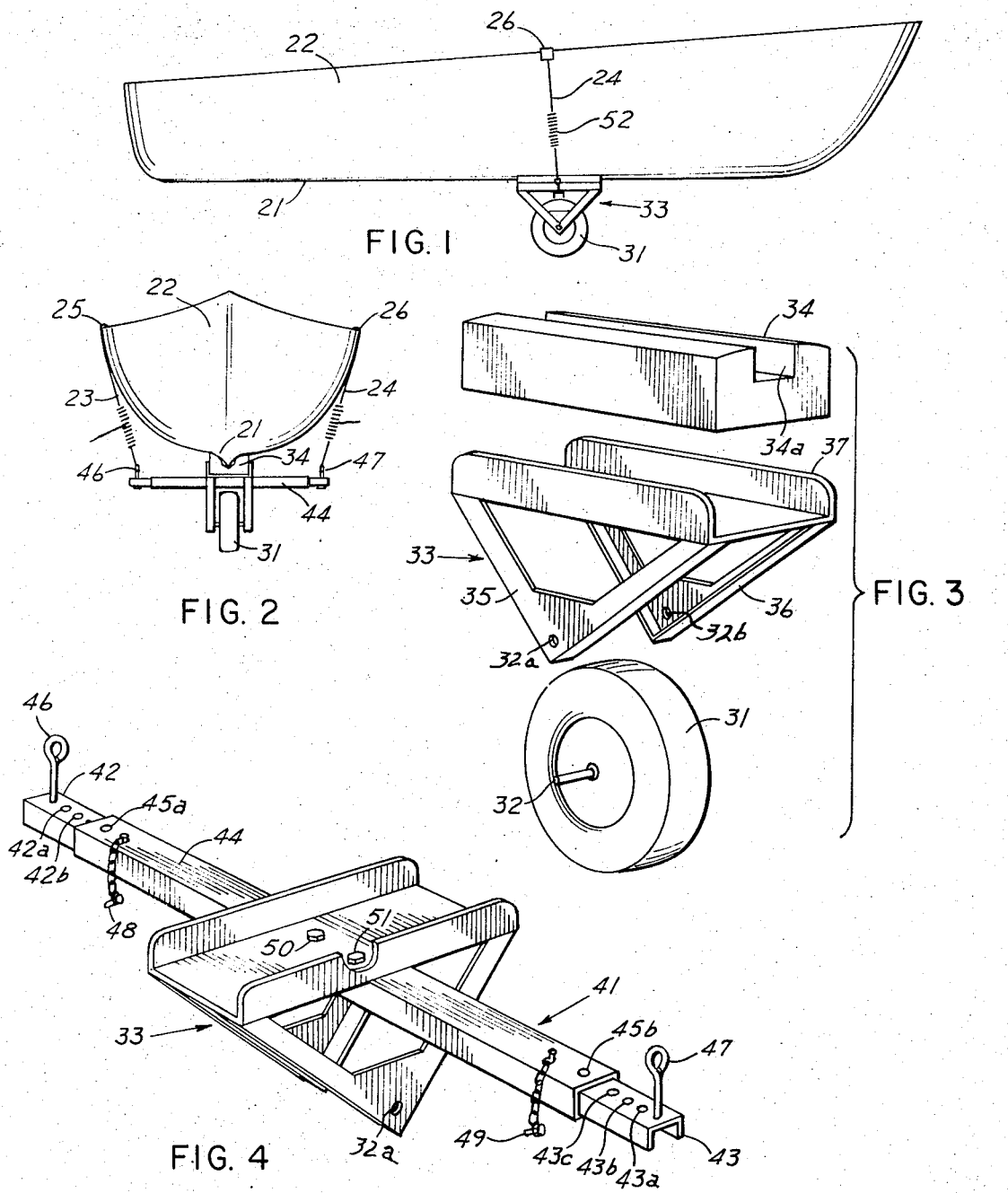
FIG. 1 is a side elevational view of a boat mounted on an apparatus according to the invention.
FIG. 2 is a front elevational view of the boat mounted on an apparatus of FIG. !1.
FIG. 3 is an exploded pictorial detail of apparatus according to the invention.
FIG. 4 is another pictorial detail of the apparatus.

The major components of the device are shown in FIG. 3. Wheel 31 may be a conventional tire-on-a-rim arrangement of various sizes, such as are commercially available. A solid rubber tire is suggested as maintenance-free for long time periods, however, a pneumatic tire provides cushioning and lightness. The wheel is rotatably supported in a frame, indicated in general by numeral 33, by conventional axle 32 which is passed through openings 32a and 32b in the frame. Axle 32 may, also, be supported in the frame in a variety of ways, all of which are well known, and various ways may be provided for temporarily securing the axle in place, as by cotter pins, etc. Frame 33 is a rigid member comprising inverted "V" members 35 and 36 forming the downward extending axle supporting members. In one embodiment, these axle supporting members are parallel V-shaped members formed of angle beams with a reinforcing, apertured gusset plate welded at the intersection. The upper portion of frame 33 is a channel 37 to which the axle supporting members are fixed extending from the lower surface thereof. Into channel 37 is inserted keel cushion 34. The channel 37 may have a variety of configurations to accept cushion 34, and, similarly, the cushion may be fixed into the tray by a number of means (not shown) including squeeze fit, bonding adhesive, or bolts. Cushion 34 may be a number of non-abrasive, resilient materials, and relatively hard rubber is suggested. Important in the configuration of cushion 34 is longitudinal keel-accepting slot 34a having appreciable width and depth. The slot 34 has a rectangular cross-section, however, triangular and other cross-sectional configurations are also possible. Further, the length of channel 37 may be made to fit the circumstances, and the cushion may be formed in one or more parts.

One form of outrigger support is illustrated in FIG. 4, and is shown in general by numeral 41, fixed into frame 33 transversely across the bottom of channel 37. Outrigger 41 is attached to member 33 in a direction perpendicular to the direction of movement wheel 31 for supporting a carried boat. The variable-length outrigger comprises main member 44 having two end members 42 and 43 telescoped into its opposed ends. The sum of the lengths of end members 42 and 43 should not greatly exceed the length of main member 44 except where one member telescopes inside the other member. Thus, the end members may be telescoped inwardly and outwardly to form an outrigger of variable length. It is convenient to have, as shown, main member 44 formed from a strong metal, hollow support tube having a crpss-section which may be rectangular, round, etc. End members 42 and 43 may be channels telescoping in rectangular tubes, or telescopable, circular pipe-in-a-pipe arrangement, etc.

In the intended use of the apparatus of the invention, it is desirable to have outrigger 41 selectively arranged at various lengths. Such a feature is effected by providing a series of apertures 42a, 42b, etc., in end member 42 and a series of similar apertures 43a, 43b, 43c, etc., in end member 43 with single apertures 45a and 45b at the opposed ends of member 44. By aligning, for example, an aperture in member 42 with aperture 45a a holding pin 49 fitted in the aligned apertures sets the length of one end of outrigger 41, and similarly the length of the other end may be selectively fixed. Member 44 may have a series of apertures along its length, and member 42 and 43 only a single aperture each with the same result. The holding or retaining pins, parts 48 and 49, are conventional pins and they may be secured by anchored chains to member 44 adjacent the apertures for convenience. Also, secured to the outward ends of members 42 and 43 respectively are eye bolts 46 and 47. These bolts may have a threaded end and may be nut-secured to the end members.

A convenient embodiment is to have outrigger 41 releasably fixed to frame 33, such as by a nut and bolt arrangement 50 and 51, however, U-bolts or the like may be used. Thus, outrigger 41 can be easily and conveniently assembled with or dismantled from the frame. Cushion 34 may have appropriate holes (not shown) drilled into its bottom to accommodate the bolt heads.

The apparatus of the invention may be attached under a boat, FIG. 2, with the keel 21 of the boat fitted into the longitudinal slot of cushion 34. The length of the outrigger 44 is adjusted so that it generally spans the beam of the boat, and from eye hooks 46 and 47 are extended anchoring lines 23 and 24. On the free ends of the lines 23 and 24 are conventional curved hooks 25 and 26 respectively which fasten over the boat side walls. These hooks are conveniently padded to protect the boat sides. A convenient length for the lines may be used and tightening levers, not shown, placed in the line to securely hold the dolly when hooks 25 and 26 are engaged on the boat walls. Outrigger 44 should be extended on each side so that lines 23 and 24 do not rub or chaff against the boat sides. Springs 52 in the anchoring lines provide give for the anchoring arrangement.

When the apparatus is attached about midway along the length of the boat, FIG. 1, the boat is essentially balanced and wheeled along by one person. Furthermore, the extended outrigger 44 will support the boat from tipping completely over when lying on its side. The device is easily dismantled removing the outrigger, and the wheel for small space storage as in an automobile trunk. The outrigger 44 is merely unbolted from frame 33, and wheel 31 removed by removing a cotter pin from axle 32.

The dolly has other uses for transporting a variety of things, and the outriggers provide a simple means for securing items on the channel. The size of the wheel may be changed for different conditions, for example, greater weights or rough terrain requires larger wheels. Greater weights may dictate heavier construction.

I claim:

1. A dolly for light boats or the like, comprising frame means including downwardly extending wheel support members; a single wheel rotatably mounted between said downwardly extending wheel support members; boat supporting pad means attached to said frame means for alignment along the keel of a carried boat; length adjustable outrigger means fixed to said frame means and providing a pair of opposed, outwardly extending ends generally parallel to the axis of rotation of said wheel and including a central section and a pair of end sections telescoped therein wherein both end sections thereof are extendable outwardly so as to be adjustable in length and stop means for each said end section to fix the length thereof at one of a plurality of lengths; and securing means inclusive of a pair of lines having padded hook means thereon, one said line means attached adjacent each end of said outrigger member and each said hook means arranged to fit over a boat's gunwale so that when said lines are tightened, a mounted boat is held securely on said dolly, and when said dolly is positioned under a boat, the boat is easily wheeled along terrain.

2. A dolly according to claim 1 wherein said outrigger means is a tube-in-a-tube arrangement inclusive of a central tube and pair of end tubes wherein both end tubes thereof are extendable outwardly so as to be adjustable in length, and stop means for each said end tube to fix the length of each end tube at one of a plurality of selected lengths.

3. A dolly according to claim 2 wherein said tubes are circular.

4. A dolly according to claim 2 wherein said outrigger means includes a central rectangular tube, and a pair of channel end members partly telescoped therein provide a length adjust for said opposed ends.

5. A dolly according to claim 1 wherein said outrigger means is selectively dismountable from said frame means.

6. A dolly according to claim 1 wherein eye bolt means depend from each of opposed ends of said outrigger for attachment of said line means thereto and further characterized by spring means in series with said gunwale hook means for snap-fitting said hook of a boat's gunwale.

* * * * *